United States Patent
Yoon

(10) Patent No.: US 9,426,107 B1
(45) Date of Patent: Aug. 23, 2016

(54) COMPUTER PROGRAM AND COMPUTING DEVICE FOR PERFORMING CORRELATION MATCHING FOR EARLY-ARRIVED-MESSAGE

(71) Applicant: TmaxSoft Co., Ltd., Gyeonggi-do (KR)

(72) Inventor: Kyung Koo Yoon, Gyeonggi-do (KR)

(73) Assignee: TmaxSoft Co., Ltd., Gyeonggi-do (KR)

( * ) Notice: Subject to any disclaimer, the term of this patent is extended or adjusted under 35 U.S.C. 154(b) by 0 days.

(21) Appl. No.: 14/751,441

(22) Filed: Jun. 26, 2015

(30) Foreign Application Priority Data

May 19, 2015 (KR) .......................... 10-2015-006987

(51) Int. Cl.
| | | |
|---|---|---|
| *G06F 15/16* | (2006.01) | |
| *H04L 12/58* | (2006.01) | |
| *H04L 29/08* | (2006.01) | |

(52) U.S. Cl.
CPC .............. *H04L 51/046* (2013.01); *H04L 67/10* (2013.01)

(58) Field of Classification Search
CPC ....... G06F 9/544; G06F 9/546; H04L 51/046; H04L 51/14; H04L 63/123; H04L 41/50; H04L 12/58; H04L 29/06; H04L 67/1002; H04L 67/1008
USPC .................. 709/206, 205, 219, 223, 225, 226
See application file for complete search history.

(56) References Cited

U.S. PATENT DOCUMENTS

| | | | | |
|---|---|---|---|---|
| 5,109,515 | A * | 4/1992 | Laggis ...................... | G06F 9/50 707/827 |
| 6,625,149 | B1 * | 9/2003 | Brustoloni .......... | H04L 12/5695 370/389 |
| 7,761,314 | B2 * | 7/2010 | Fitzgerald .............. | G06Q 10/02 705/5 |
| 2006/0200456 | A1 * | 9/2006 | Zohar ................... | H04L 67/322 |
| 2007/0078667 | A1 | 4/2007 | Chand et al. | |
| 2007/0143430 | A1 * | 6/2007 | Johnson .................. | G06F 9/544 709/206 |
| 2010/0070973 | A1 | 3/2010 | Addala et al. | |
| 2012/0005286 | A1 * | 1/2012 | Bhasin .................... | G06F 9/546 709/206 |
| 2013/0219412 | A1 | 8/2013 | Mi et al. | |

* cited by examiner

*Primary Examiner* — Ruolei Zong

(74) *Attorney, Agent, or Firm* — Fish & Tsang LLP

(57) ABSTRACT

Disclosed is a computer program stored in a computer-readable medium performing correlation matching for an early-arrived-message. The computer program allows a computer to perform the following steps and the steps include transmitting a message; registering a listener; determining whether an early-arrived-message is present by checking an early-arrived-message map; and performing correlation matching of the listener and the message when the early-arrived-message is present, in which the listener performs correlation matching with the message and when the correlation matching is performed, the listener permits a process based on the message to be performed.

15 Claims, 4 Drawing Sheets

COMPUTER PROGRAM AND COMPUTING DEVICE FOR PERFORMING CORRELATION MATCHING FOR EARLY-ARRIVED-MESSAGE

This application claims priority to and the benefit of Korean Patent Application No. 10-2015-0069877 filed in the Korean Intellectual Property Office on May 19, 2015, the entire contents of which are incorporated herein by reference.

FIELD OF THE INVENTION

The present invention relates to an enterprise service bus (ESB) and business process management (BPM), and more particularly, to performing correlation matching for an early-arrived-message.

BACKGROUND OF THE INVENTION

An enterprise service bus is a core intermediate tool that binds services as a componential logic set. The enterprise service bus is an architecture pattern which can be designed and extended to suit a business process environment. The bus can be implemented by various methods such as using basic messaging, enterprise application integration (EAI), relay technology or using a component in a platform such as a service integration bus of a J2EE system.

With the development of information communication technology, a service of an enterprise has been increasingly performed by communication using various enterprises and information communication networks. For example, when a user who intends to make a trip performs a reservation associated with an airline ticket and a hotel on the home page of a travel agency, the travel agency communicates with servers of the airline and the hotel to enable the user to reserve the airline ticket and the hotel.

The process can be performed on a computing device of the enterprise. For example, the process can be performed through transmission/reception of a message on a computing device of another enterprise or the computing device of the enterprise. In the aforementioned example, when the server of the travel agency requests airline ticket reservation and hotel reservation approval messages to the servers of the airline and the hotel and receives the reservation approval messages from the servers of the airline and the hotel, a travel reservation process can be performed.

In the message based service, one process (for example, the travel reservation) may include multiple steps (for example, the airline ticket reservation and the hotel reservation). Therefore, only when the receiver of the message accurately determines which request the message is a message for (for example, whether the message corresponds to the approval for the airline ticket reservation request or the approval for the hotel reservation request), no error occurs in the progress of the process.

As described above, a technology that performs the process by matching the message and the message receiver is collectively referred to as process correlation. Since multiple processes and multiple steps are performed in the computing device of an enterprise in the process correlation, there is a demand for a method for rapidly and accurately determining a request which the received message is associated with in the art.

SUMMARY OF THE INVENTION

The present invention has been made in an effort to register a listener associated with a message and easily perform correlation matching through the listener to smoothly perform a process.

The present invention has also been made in an effort to perform a process by correlation-matching a message and a listener associated therewith by using a correlation value.

The present invention has also been made in an effort to perform a process by performing correlation matching even when a message is received before a listener associated with a message is registered.

In order to implement the objects, an exemplary embodiment of the present invention provides a computer program stored in a computer-readable medium performing correlation matching for an early-arrived-message. The computer program allows a computer to perform the following steps and the steps include: transmitting a message request; registering a listener; determining whether an early-arrived-message is present by checking an early-arrived-message map; and performing correlation matching of the listener and the message when the early-arrived-message is present, in which the listener performs correlation matching with the message and when the correlation matching is performed, the listener permits a process based on the message to be performed.

Another exemplary embodiment of the present invention provides a computer program stored in a computer-readable medium performing correlation matching for an early-arrived-message. In the computer program, the computer program allows a computer to perform the following steps including: transmitting a message; determining whether a listener who is able to match the message is registered; and registering the message in an early-arrived-message map when the listener is not registered, wherein the early-arrived-message map permits correlation matching of the listener and the message when the listener is registered after the message is received, and when the correlation matching of the listener and the message is performed, the early-arrived-message map is used to permit a process based on the message to be performed.

An exemplary embodiment of the present invention provides a computing device providing correlation matching for an early-arrived-message. The computing device may include: a transceiving module transmitting a message request; a listener registering module registering a listener for performing a process based on the message by correlation matching a message; an early-arrived-message determining module determining whether an early-arrived-message is present by checking an early-arrived-message map; and a correlation matching module performing correlation matching of the listener and the message when the early-arrived-message is present.

Another exemplary embodiment of the present invention provides a computing device providing correlation matching for an early-arrived-message. The computing device may include: a transceiving module receiving the message; a listener registering module determining whether a listener who is able to match the message is registered; and an early-arrived-message processing module registering the message in an early-arrived-message map in order to permit a process associated with the message to be performed by performing correlation matching with the listener at the time of registering the listener afterwards when the listener is not registered.

According to exemplary embodiments of the present invention, a listener associated with a message is registered and correlation matching is easily performed through the listener to smoothly perform a process.

A process can be performed by matching a message and a listener associated therewith by using a correlation value.

A process can be performed by performing correlation matching even when a message is received before a listener associated with a message is registered.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
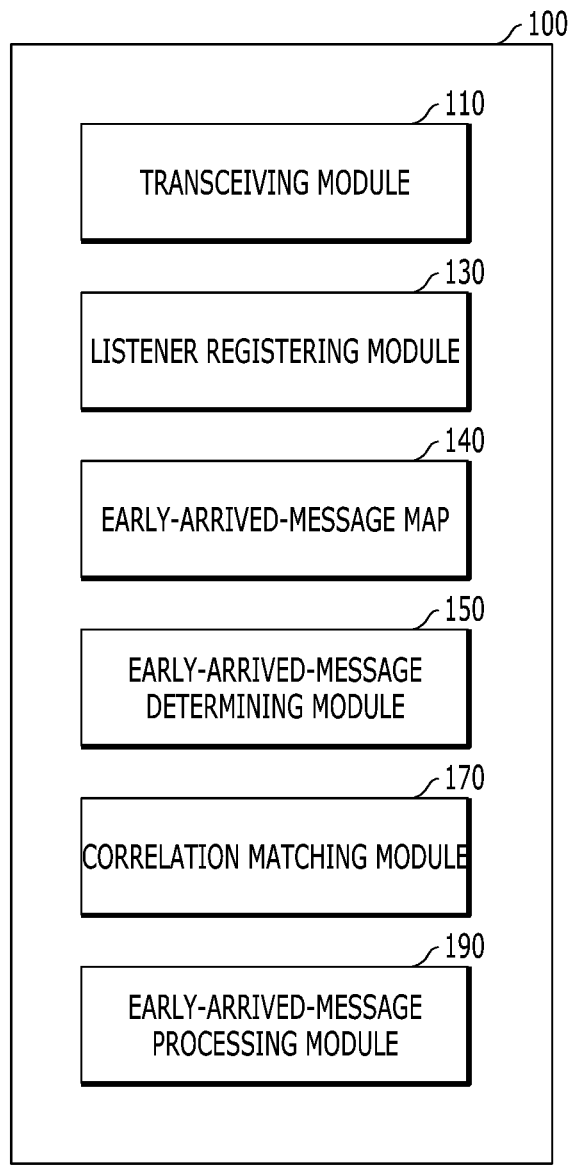
FIG. 1 is a block diagram of a computing device providing correlation matching for an early-arrived-message according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Various exemplary embodiments will now be described with reference to the drawings, and similar reference numerals are used to represent similar elements throughout the drawings. In the specification, various descriptions are presented to provide appreciation of the present invention. However, it is apparent that the exemplary embodiments can be executed without the detailed description. In other examples, known structures and devices are presented in a block diagram form in order to facilitate description of the embodiments.

"Component", "module", "system", and the like which are terms used in the specification designate a computer-related entity, hardware, firmware, software, or a combination of software and hardware, or execution of software. For example, a component may be a processing process executed on a processor, the processor, an object, an execution thread, a program, and/or a computer, but is not limited thereto. For example, both an application executed in a computing device and the computing device may be components. One or more components may reside in the processor and/or execution thread and one component may be localized in one computer or distributed among two or more computers. Further, the components may be executed by various computer-readable media having various data structures, which are stored therein. The components may, for example, perform communication through local and/or remote processing according to a signal (for example, data through a network such as the Internet with another system through data and/or a signal from one component that interacts with another component in a local system and a distribution system) having one or more data packets.

The description of the presented exemplary embodiments is provided so that those skilled in the art of the present invention use or implement the present invention. It will be apparent to those skilled in the art that various modifications of the embodiments can be made and general principles defined herein can be applied to other embodiments without departing from the scope of the present invention. Therefore, the present invention is not limited to the embodiments presented herein, but should be analyzed within the widest range which is associated with the principles and new features presented herein.

FIG. 1 is a block diagram of a computing device providing correlation matching for an early-arrived-message according to an exemplary embodiment of the present invention.

The computing device 100 providing correlation matching for an early-arrived-message according to the exemplary embodiment of the present invention may include a transceiving module 110, a listener registration module 130, an early-arrived-message map 140, an early-arrived-message determining module 150, a correlation matching module 170, and an early-arrived-message processing module 190.

The computing device 100 according to the exemplary embodiment of the present invention may include, for example, a personal computer, a workstation, a mainframe computer, a medium-size computer, a notebook, a tablet PC, a smart phone, and/or a mobile terminal, but is not limited thereto.

The transceiving module 110 may transmit a message request to an external computing device (not illustrated) and receive a message from the external computing device. The message may include a response message associated with the message request. For example, the message request may include an airline ticket reservation approval message request transmitted to an airline server in a travel reservation process of a client. The message may be the airline ticket reservation approval message. When the computing device 100 receives the message, the computing device 100 performs a next step of the travel reservation process to perform the entire process. The aforementioned message is just an example and the transceiving module 110 of the present invention may transceive a message for a predetermined business with respect to a predetermined process. The transceiving module 110 may communicate with the external device through a wired/wireless network. As wireless communication technology, wireless LAN (WLAN) (Wi-Fi), a wireless broadband (Wibro), world interoperability for microwave access (Wimax), high speed downlink packet access (HSDPA), long term evolution (LTE), and the like may be used. As wired communication technology, digital subscriber line (XDSL), fibers to the home (FTTH), power line communication (PLC), and the like may be used. The transceiving module 110 may perform Internet communication and use protocols such as TCP/IP, GPRS tunneling protocol (GTP), and the like for the Internet communication. Further, the transceiving module 110 may include a module that transceives a command in a processor. The transceiving module is just an example and the transceiving module 110 may include a module which may communicate with a predetermined external computing device and a predetermined module which may transceive a command in the computing device.

The listener registration module 130 may register a listener. The listener performs correlation matching with the message and when the listener makes correlation matching with the message, the listener may permit a process based on the message to be performed. The listener may be registered on a memory (not illustrated). The listener determines which message request the received message is associated with and when it is confirmed that the received message is the message associated with the message request through the correlation matching, the computing device 100 may allow the process to be performed based on the message. The listener is a listener associated with the message request and the listener may include a correlation value for the correlation matching with the message. The listener may be registered for every process type or at every detailed step of the process. The listener may be registered for every message request. The listener is registered for every message request to match the message for the message request. The listener may be used for matching the message for the message request. For correlation of the process, receiving the message is rapidly notified by using respective message dedicated listeners to minimize overheads associated with restarting execution of the process after matching. For example, in the aforementioned example, the listener may be registered in the travel reservation process or other predetermined type of process by the unit of the process. Further, the listener may be registered in each of several detailed steps such as hotel reservation and airline ticket reservation in the travel reservation process. The aforementioned listener is just an example and the listener may be registered and associated with respective predetermined types of processes and detailed steps of each process. Further, when the message is received, the listener registration module 130 may determine whether a listener who may match the message is registered.

The early-arrived-message map 140 may register an early-arrived-message received before the listener is registered for processing when the message arrives before the listener is registered on the memory of the computing device 100. When the message is received and thereafter, a listener corresponding to the message is registered, and the early-arrived-message map 140 may permit the listener and the message to correlation-match each other. The early-arrived-message map 140 may be used for permitting the computing device 100 to perform the process based on the message when the listener and the message correlation-match each other. In the case of the process correlation in the related art, communication with the external computing device of the transceiving module 100 is smooth, but there is a problem in that when the message associated with the listener is first received before the listener is registered, the correlation matching is not performed due to a problem on the computing device 100. In this case, the message may be dropped, disregarded, or bring about an error in the computing device 100 because the listener associated with the message is not present. Further, when the listener is registered after the message is dropped or disregarded in the computing device 100, the external computing device (not illustrated) has already transmitted the message associated with the message request, and as a result, the external computing device will not retransmit the message. Moreover, the listener will infinitely wait for a message which has already been dropped or disregarded in the computing device 100 and is not received. Therefore, the existing process correlation has a problem in that memory waste is caused and a process progress is in a state of infinitely waiting.

However, the computing device 100 according to the exemplary embodiment of the present invention registers the early-arrived-message in the early-arrived-message map and thereafter, when the listener is registered, achieves the correlation matching for the message to perform the process. Therefore, according to the exemplary embodiment of the present invention, the correlation matching may be performed regardless of a temporal sequence of the listener registration for receiving the message and the correlation matching. Further, the early-arrived-message map 140 may be positioned on the memory. In addition, a life time may be set in the early-arrived-message registered in the early-arrived-message map 140 for saving a memory usage. When the life time set in the early-arrived-message registered in the early-arrived-message map 140 elapses, the early-arrived-message may be dropped. Therefore, the exemplary embodiment of the present invention may provide the correlation matching for the early-arrived-message and maintain the memory usage at an appropriate level.

The early-arrived-message determining module 150 checks the early-arrived-message map to determine whether the early-arrived-message is present. When the listener is registered, the early-arrived-message determining module 150 may check whether the early-arrived-message which may correlation-match the listener is present.

The correlation matching module 170 may permit the process based on the message to be performed by performing the correlation matching of the listener and the message. As described above, the computing device 100 determines which request the received message is a message associated with by performing the correlation matching to perform the progress. The correlation matching module 170 compares a listener correlation value associated with the listener and the message correlation value associated with the message to match the message and the listener. The correlation value may include at least one of a service ID, a process ID, and a task ID. The listener may be registered based on at least one of the service ID, the process ID, and the task ID. The service ID may include information (e.g., an address of a travel server, a port number, and the like) associated with an end point of the message. The process ID may include information associated with the type (e.g., a process associated with travel reservation, and the like) of the process. The task ID may include information associated with the detailed steps (e.g., the hotel reservation step, the airline ticket reservation step, and the like) of the process. The correlation value may be generated based on a registration expression or a matching expression. The registration expression may include an expression of calculating an internal variable value of the process performed in the computing device by using a predetermined function. Further, the matching expression may include an expression of calculating a message of a service by using the predetermined function. The listener correlation value may include a result value of the registration expression. The message correlation value may include a result value of the matching expression. When the message is received, the correlation matching module 170 determines whether correlation-matching for the message is required. In addition, the correlation matching module 170 performs the correlation matching by comparing the correlation values of the listener and the message when it is determined that the correlation matching is required. Further, when the listener is registered, the correlation matching module 170 checks the early-arrived-message map to determine whether the early-arrived-message is present. The correlation matching module 170 performs the correlation matching of the listener and the early-arrived-message when the early-arrived-message is present. When the early-arrived-message is not present at the time of registering the listener, the correlation matching module 170 may switch the registered listener to a sleep status.

The early-arrived-message processing module 190 may generate an early-arrived-message map. When the message is received, the listener registration module 130 may determine whether the listener who may correlation-match the message is registered. When the listener associated with the message is not registered according to the determination result, the earlyarrived-message processing module 190 may register the message in the early-arrived-message map in order to permit the process associated with the message to be performed by performing the correlation matching with the listener when the listener is registered afterwards. The early-arrived-message processing module 190 may register the early-arrived-message in the early-arrived-message map and set the life time of the early-arrived-message. The early-arrived-message processing module 190 checks the life time of the early-arrived-messages registered in the early-arrived-message map to drop a message of which the life time elapses. Therefore, the early-arrived-message processing module 190 may control the memory usage at the appropriate level while permitting the correlation matching to be performed regardless of the temporal sequence of the listener registration and the message reception.

Figure 2:
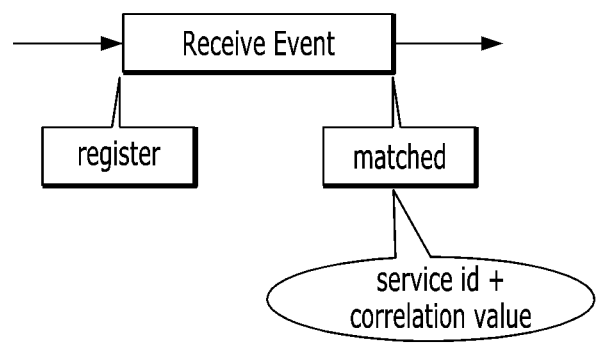
FIG. 2 is an exemplary diagram illustrating a correlation matching execution operation according to the exemplary embodiment of the present invention.

FIG. 2 is an exemplary diagram illustrating a correlation matching execution operation according to an exemplary embodiment of the present invention.

The computing device 100 according to the exemplary embodiment of the present invention registers the listener who may match the message associated with the message request and performs the correlation matching of the message and the listener when the message is received (a receive event) to perform the process.

The computing device 100 registers the listener including the listener correlation value. The listener correlation value includes a value to perform correlation matching with the received message. The computing device 100 performs the correlation matching of the message and the listener to perform the process when the message having the message correlation value which may match the listener correlation value is present in the early-arrived-message map at the time of registering the listener including the listener correlation value.

For example, in the aforementioned travel reservation process, the computing device 100 of the travel agency may transmit the airline ticket reservation approval message request to the airline server and request transmitting the hotel reservation approval message to the hotel server. The computing device 100 may perform a travel reservation completion process when receiving the airline ticket reservation approval message and the hotel reservation approval message. In this case, the computing device 100 may transmit the airline ticket reservation approval message request to the airline server and register the listener associated with the airline ticket reservation approval message. Further, the computing device 100 may transmit the hotel reservation approval message request to the hotel server and register the listener associated with the hotel reservation approval message. When the reservation approval message is received, the computing device 100 may determine whether the reservation approval message is the hotel reservation approval message or the airline ticket reservation approval message through correlation with the listener for the message. However, the registration of the listener is delayed due to a problem of the computing device 100 or an unspecific reason, and as a result, the airline ticket reservation message may be received before the listener is registered. In this case, the computing device 100 may register the airline ticket reservation approval message in the early-arrived-message map. Thereafter, when the listener associated with the airline ticket reservation approval message is registered, the computing device 100 checks the early-arrived-message map and when the airline ticket reservation approval message is present, the computing device 100 performs the correlation matching with the listener to perform the process.

However, when a message having a message correlation value which may match the listener correlation value is not present in the early-arrived-message map at the time of registering the listener, the computing device 100 registers the listener and switches the listener to the sleep status. Thereafter, when the message is received, the computing device 100 wakes up the listener to perform the correlation matching.

The computing device 100 receives the message to calculate the message correlation value and determines whether the listener having the listener correlation value which may match the message correlation value is present. The computing device 100 performs the correlation matching of the listener and the message and performs the process based on the message when the listener is present. The computing device 100 regards that the listener is not yet registered and registers the received message in the early-arrived-message map when the listener is not present. The messages registered in the early-arrived-message map may correlation-match the listeners when the listeners which may correlation-match with the messages are registered afterwards. Further, the computing device 100 sets the life time in the early-arrived-messages registered in the early-arrived-message map, time-out processes messages of which the life time elapses, and drops the corresponding messages from the early-arrived-message map.

Figure 3:
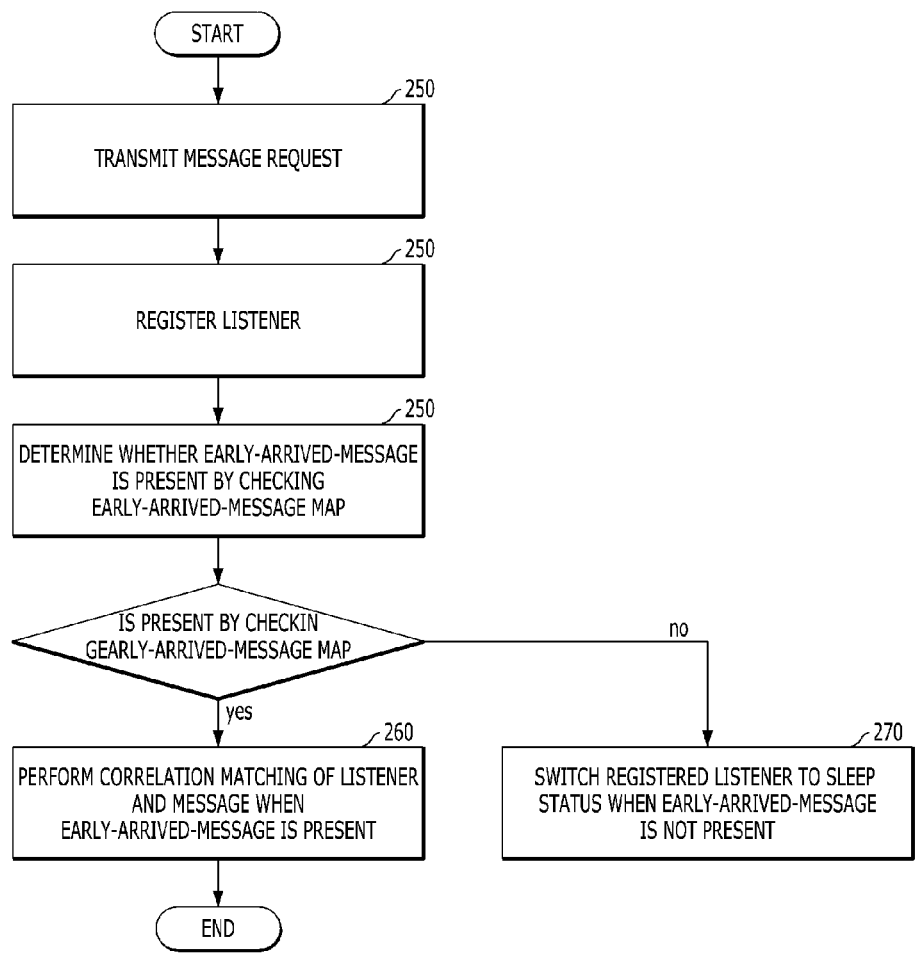
FIG. 3 is a flowchart of a method for providing correlation matching for an early-arrived-message according to an exemplary embodiment of the present invention.

FIG. 3 is a flowchart of a method for providing correlation matching for an early-arrived-message according to an exemplary embodiment of the present invention.

All steps illustrated in FIG. 3 are not required and as necessary, some steps may be omitted or unillustrated steps may be added.

In the exemplary embodiment, the method may be performed by a computing device 100. Further, the computing device 100 may communicate with another computing device (not illustrated).

A receiving module 110 may transmit a message request to an external computing device (not illustrated). The receiving module 110 may receive a message from the external computing device. The message may include a message (e.g., requesting a hotel reservation approval message for hotel reservation) requested for performing a process. Further, the message transmission and reception may be performed in the computing device 100 of the present invention.

A listener registration module 130 may register a listener who may correlation-match the message (230). The listener may be registered on a memory. The listener may include a listener correlation value for the correlation matching. The listener correlation value may include at least one of a service ID, a process ID, and a task ID.

An early-arrived-message determining module 150 may determine whether an early-arrived-message is present at the time of registering the listener (250).

A correlation matching module 170 may perform the correlation matching of the listener and the message when the early-arrived-message is present (260). The correlation matching may be determined by comparing the correlation value of the listener and a correlation value of the message. The computing device 100 may determine which request the message is a response message associated with, through the correlation matching. For example, in the aforementioned example, when the computing device 100 receives a message associated with a reservation approval, the computing device may determine whether the reservation approval is an approval message associated with a travel reservation request, through correlation matching with a listener associated with the message. Further, the computing device 100 may determine whether the reservation approval is an approval message associated with airline ticket reservation during a travel reservation request. The aforementioned message is just an example and the computing device 100 according to the exemplary embodiment of the present invention may perform correlation matching of a predetermined message associated with a predetermined process.

The correlation matching module 170 may switch the registered listener to a sleep status when the early-arrived-message is not present (270). Further, the correlation matching module 170 may perform correlation matching of the message when a message associated with the listener is received afterwards.

Figure 4:
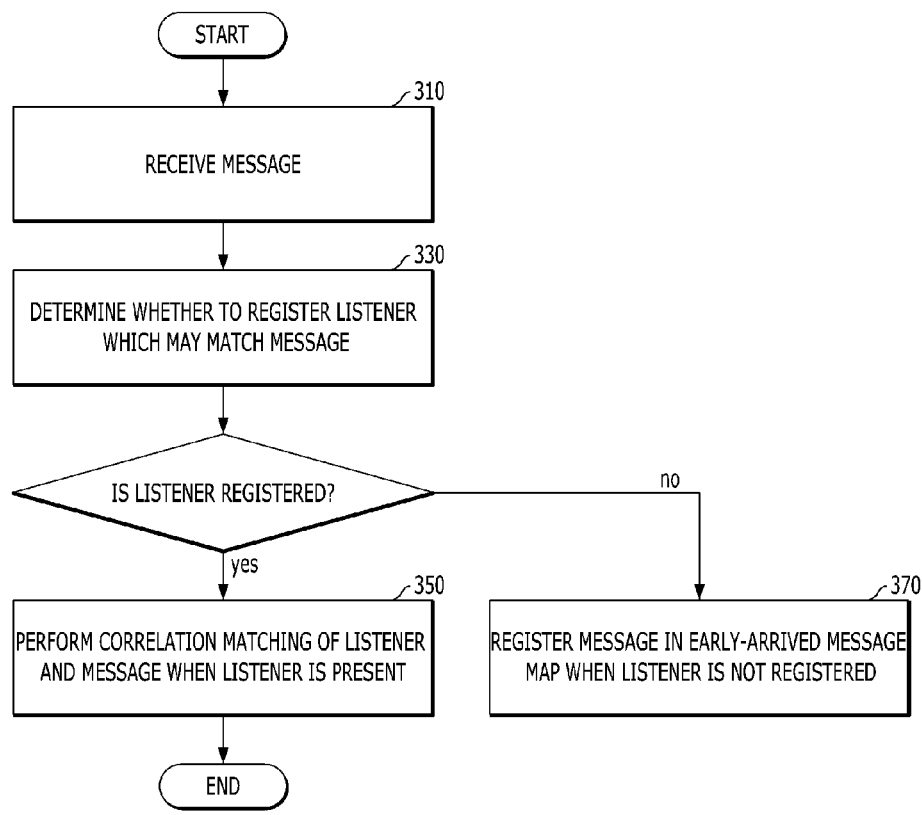
FIG. 4 is a flowchart of a method for providing correlation matching for an early-arrived-message according to another exemplary embodiment of the present invention.

FIG. 4 is a flowchart of a method for providing correlation matching for an early-arrived-message according to another exemplary embodiment of the present invention.

All steps illustrated in FIG. 4 are not required and as necessary, some steps may be omitted or unillustrated steps may be added.

The transceiving module 110 may receive a message (310). The message may include a response message associated with a message request. The transceiving module 110 may receive the message from the external computing device.

The listener registration module 130 may determine whether to register a listener who may match the message (330).

The correlation matching module 170 may perform the correlation matching of the listener and the message when the listener is registered (350). As described above, the correlation matching may be performed by comparing a listener correlation value and a message correlation value. When the correlation matching is performed, it may be determined which request the message is a response message associated with. The computing module 100 may perform a process based on the message.

When the listener is not registered, the early-arrived-message processing module 190 may register the message in the early-arrived-message map in order to permit the process associated with the message by performing the correlation matching with the listener when the listener is registered afterwards. As described above, the early-arrived-message processing module 190 may manage a memory by configuring a life time in the early-arrived-message.

It will be appreciated by those skilled in the art that information and signals may be expressed by using various different predetermined technologies and techniques. For example, data, instructions, commands, information, signals, bits, symbols, chips which may be referred to in the above description may be expressed by voltage, current, electromagnetic waves, magnetic fields, or particles, optical fields or particles, or predetermined combinations thereof.

Those skilled in the art of the present invention will appreciate that various exemplary logic blocks, modules, processors, means, circuits, and algorithm steps can be implemented by electronic hardware, various types of programs or design codes (designated as "software" herein for easy description), or a combination thereof described in association with the exemplary embodiments disclosed herein. In order to clearly describe the intercompatibility of the hardware and the software, various exemplary components, blocks, modules, circuits, and steps have been generally described above in association with functions thereof. Whether the functions are implemented as hardware or software depends on design restrictions given to a specific application and an entire system. Those skilled in the art of the present invention may implement functions described by various methods with respect to each specific application, but it should not be understood that the implementation determination departs from the scope of the present invention.

Various embodiments presented herein may be implemented as manufactured articles using a method, an apparatus, or a standard programming and/or engineering technique. The term "manufactured article" includes a computer program, a carrier, or a medium which is accessible by a predetermined computer-readable device. For example, a computer-readable medium includes a magnetic storage device (for example, a hard disk, a floppy disk, a magnetic strip, or the like), an optical disk (for example, a CD, a DVD, or the like), a smart card, and a flash memory device (for example, an EEPROM, a card, a stick, a key drive, or the like, but is not limited thereto. Further, various storage media presented herein include one or more devices and/or other machine-readable media for storing information. The term "machine-readable media" include a wireless channel and various other media that can store, possess, and/or transfer command(s) and/or data, but are not limited thereto.

It will be appreciated that a specific order or a hierarchical structure of steps in the presented processes is one example of exemplary accesses. It will be appreciated that the specific order or the hierarchical structure of the steps in the processes within the scope of the present invention may be rearranged based on design priorities. Appended method claims provide elements of various steps in a sample order, but it does not mean that the method claims are limited to the presented specific order or hierarchical structure.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A non-transitory computer-readable medium including a plurality of instructions executable by one or more processors, wherein the instructions allow one or more processors to perform steps including:

transmitting a message request;

registering a listener;

determining whether an early-arrived-message is present by checking an early-arrived-message map at the time of registering the listener;

performing correlation matching of the listener and the message when the early-arrived-message is present; and switching the registered listener to a sleep status when the early-arrived-message is not present at the time of registering the listener, wherein the listener performs correlation matching with the message and when the correlation matching is completed, the listener permits a process based on the message to be performed.

2. The non-transitory computer-readable medium including a plurality of instructions executable by one or more processors of claim 1, wherein the early-arrived-message is a message associated with the listener received before the listener is registered.

3. The non-transitory computer-readable medium including a plurality of instructions executable by one or more processors of claim 1, wherein the steps further include:
receiving the message,
wherein the listener is a listener associated with the message request and the message is a message associated with the message request.

4. The non-transitory computer-readable medium including a plurality of instructions executable by one or more processors of claim 1, wherein the performing of the correlation matching includes determining whether the listener and the message match each other by comparing a listener correlation value associated with the listener and a message correlation value associated with the message.

5. The non-transitory computer-readable medium including a plurality of instructions executable by one or more processors of claim 4, wherein the correlation value includes at least one of a service ID, a process ID, and a task ID, and the listener is registered based on the service ID.

6. The non-transitory computer-readable medium including a plurality of instructions executable by one or more processors of claim 5, wherein the service ID includes information associated with an end point receiving the message,
the process ID includes information associated with a type of the process, and
the task ID includes information associated with detailed steps of the process.

7. The non-transitory computer-readable medium including a plurality of instructions executable by one or more processors of claim 4, wherein the correlation value is generated based on a registration expression or a matching expression.

8. The non-transitory computer-readable medium including a plurality of instructions executable by one or more processors of claim 1, wherein the listener is registered on a memory.

9. A non-transitory computer-readable medium including a plurality of instructions executable by one or more processors, wherein the instructions allow one or more processors to perform steps including:
receiving a message;
determining whether a listener who is able to match the message is registered;
registering the message in an early-arrived-message map when the listener is not registered,
waking up the listener to perform the correlation matching when the listener is registered before receiving the message,
wherein the listener is in a sleep status when the listener is registered before receiving the message,
wherein the early-arrived-message map permits correlation matching of the listener and the message when the listener is registered after the message is received, and when the correlation matching of the listener and the message is performed, the early-arrived-message map is used to permit a process based on the message to be performed.

10. The non-transitory computer-readable medium including a plurality of instructions executable by one or more processors of claim 9, wherein the steps further include:
performing correlation matching of the message and the listener when the listener is registered.

11. The non-transitory computer-readable medium including a plurality of instructions executable by one or more processors of claim 9, wherein the registering in the early-arrived-map includes setting a life time in the message.

12. The non-transitory computer-readable medium including a plurality of instructions executable by one or more processors of claim 11, wherein the steps further include:
dropping the message when the life time elapses.

13. The non-transitory computer-readable medium including a plurality of instructions executable by one or more processors of claim 9, wherein the early-arrived-message map is positioned on a memory.

14. A computing device providing correlation matching for an early-arrived-message, the computing device comprising:
a processor;
a memory configured to store instructions executable by the processor;
wherein the processor includes:
a transceiving module transmitting message request;
a listener registering module registering a listener for performing a process based on the message by performing correlation matching a message;
an early-arrived-message determining module determining whether an early-arrived-message is present by checking an early-arrived-message map at the time of registering the listener; and
a correlation matching module performing correlation matching of the listener and the message when the early-arrived-message is present and switch the registered listener to a sleep status when the early-arrived-message is not present at the time of registering the listener.

15. A computing device providing correlation matching for an early-arrived-message, the computing device comprising:
a processor;
a memory configured to store instructions executable by the processor;
wherein the processor includes:
a transceiving module receiving the message;
a listener registering module determining whether a listener who is able to match the message is registered; and
an early-arrived-message processing module registering the message in an early-arrived-message map in order to permit a process associated with the message to be performed by performing correlation matching with the listener at the time of registering the listener afterwards when the listener is not registered;
a correlation matching module waking up the listener to perform the correlation matching when the listener is registered before receiving the message,
wherein the listener is in a sleep status when the listener is registered before receiving the message.

* * * * *